United States Patent [19]
Martin

[11] Patent Number: 5,961,413
[45] Date of Patent: Oct. 5, 1999

[54] HYDRAULIC DRIVE FOR CONSTRUCTION MACHINE

[75] Inventor: Louis Martin, Compiegne, France

[73] Assignee: Poclain Hydraulics, Verberie, France

[21] Appl. No.: 09/031,202

[22] Filed: Feb. 26, 1998

[30] Foreign Application Priority Data

Feb. 27, 1997 [FR] France ................................. 97 02340

[51] Int. Cl.[6] .............................................. F16H 47/04
[52] U.S. Cl. ............................................................. 475/83
[58] Field of Search ................... 475/83, 31, 72, 475/80, 298

[56] References Cited

U.S. PATENT DOCUMENTS

| | | | |
|---|---|---|---|
| 2,155,198 | 4/1939 | Lawrence | 475/83 |
| 3,296,893 | 1/1967 | Shaffer et al. | 475/83 |
| 3,679,032 | 7/1972 | Bennett | 192/46 |
| 4,271,725 | 6/1981 | Takao et al. | 475/83 |
| 4,431,073 | 2/1984 | Nagao et al. | 475/83 X |
| 5,035,310 | 7/1991 | Meyerle | 192/48.5 |
| 5,368,527 | 11/1994 | Forster | 475/83 |
| 5,437,338 | 8/1995 | Martin et al. | 173/47 |
| 5,678,462 | 10/1997 | Bausenhart et al. | 475/83 X |

FOREIGN PATENT DOCUMENTS

| | | | |
|---|---|---|---|
| 47607 | 7/1976 | France | 475/83 |
| 195 03 477 | 8/1996 | Germany . | |
| 50758 | 4/1979 | Japan | 475/83 |
| 0397440 | 8/1965 | Switzerland . | |

*Primary Examiner*—Charles A. Marmor
*Assistant Examiner*—Ha Ho
*Attorney, Agent, or Firm*—Ladas & Parry

[57] ABSTRACT

A hydraulic motor comprising a casing, a reaction member, a cylinder block, an inner fluid distributor valve fast with the casing with respect to rotation about the axis of the motor and a driving shaft extending inside the casing coaxially to said axis. The motor is a low-speed, high-torque motor and comprises, disposed inside the casing, a coupling member fast in rotation with the cylinder block, a step-up gear, first and second mechanical engagement means for connecting the coupling member and the driving shaft and, respectively, the coupling member and the step-up gear, in rotation. The coupling member is mobile between a first and a second position in which the first and the second engagement means are selectively activated and de-activated. The motor comprises means for controlling the displacement of the coupling member between its positions. The driving shaft is capable of constituting a portion of the main shaft of the transmission of a vehicle.

13 Claims, 4 Drawing Sheets

HYDRAULIC DRIVE FOR CONSTRUCTION MACHINE

FIELD OF THE INVENTION

The present invention relates to a hydraulic drive unit comprising:

a fixed casing comprising principal fluid supply and exhaust conduits;

a reaction member fast with the casing;

a cylinder block mounted for relative rotation about an axis of rotation with respect to said reaction member and which comprises a plurality of cylinder and piston assemblies, disposed radially with respect to the axis of rotation and capable of being supplied with fluid under pressure;

an inner fluid distributor valve fast with the casing with respect to rotation about the axis of rotation, and comprising distribution conduits capable of placing the cylinders in communication with the principal fluid supply and exhaust conduits; and a driving shaft extending inside the casing coaxially to the axis of rotation and capable of being driven in rotation with the cylinder block.

BACKGROUND OF THE INVENTION

A motor of this type is for example used for driving a public works machine or the like, such as a loader with four driving wheels. In accordance with the known prior art, this motor forms part of a hydrostatic transmission comprising a pump for supplying the motor, the motor itself, a gear box generally with two speeds, and two axles whose ends are connected to the wheels of the vehicle. The motor is a high-speed motor and its driven shaft is not coaxial with the main shaft of the transmission, with the result that a (transverse) connecting shaft must be provided between the motor and the transmission shaft. The driven shaft of the motor or the connecting shaft meshes on the input of the gear box. At the output, said gear box presents a spur reduction gear connected to the main shaft of the transmission. The gear box makes it possible to obtain two different speed ratios for the main shaft of the transmission but, the motor being a high speed motor, these speeds remain considerable. Consequently, it is necessary to provide a final reduction gear in each of the wheels in order to return the speeds of rotation to usual values.

This type of transmission which comprises a high-speed motor presents several drawbacks. On the one hand, the high-speed hydraulic motor (whose speed of rotation at the output is conventionally included between 2000 and 3000 rpm) is noisy. On the other hand, the motor is offset with respect to the main shaft of the transmission, with the result that the motor and gear box assembly is cumbersome. Finally, the necessity of providing reduction gears in the wheels induces a risk of fragility of the transmission.

It is an object of the present invention to overcome these drawbacks by proposing a motor capable of constituting the motor of a transmission with two speed ranges, which reduces noise and bulk and increases reliability.

SUMMARY OF THE INVENTION

This object is attained in that, the hydraulic motor being a low-speed, high-torque motor, it further comprises, disposed inside the casing:

a coupling member fast in rotation with the cylinder block, first mechanical engagement means for connecting the coupling member and the driving shaft in rotation, a step-up gear comprising at least one step-up member, capable of driving the driving shaft in rotation and mounted on a secondary shaft having an axis parallel to the axis of rotation of the motor, and second mechanical engagement members for connecting the coupling member and the step-up gear in rotation, the coupling member being mobile between a first position in which the first mechanical engagement means are activated, while the second mechanical engagement means are de-activated, and a second position in which the second mechanical engagement means are activated, while the first mechanical engagement means are de-activated, the motor comprising means for controlling the displacement of the coupling member between said first and second position, and the driving shaft is a through shaft capable of forming a portion of the main shaft of the transmission of a vehicle.

The invention therefore proposes using a low-speed, high-torque motor. This type of motor, usually designated as "low-speed motor", conventionally drives the driven shaft at speeds of rotation at normal rate of the order of 75 to 150 rpm and are currently capable of generating cubic capacities of up to 6 liters per revolution, and even about ten liters per revolution. Thanks to its particular arrangement, the low-speed hydraulic motor may be directly coaxial to the main shaft of the transmission of the vehicle, i.e. the driving shaft forms a portion of this main shaft. Furthermore, the means for obtaining two speed ratios (coupling member, first and second engagement means, step-up gear) are directly placed inside the casing of the motor. This makes it possible to limit the dimensions very clearly with respect to the conventional system comprising an offset high-speed motor and a separate gear box.

The coupling member advantageously comprises an annular shaft mounted concentrically with the driving shaft and therearound.

According to an advantageous arrangement, the cylinder block presents an axial extension having an axial face provided with splines, while the coupling member presents an axial face likewise provided with splines adapted to cooperate with said splines of the axial extension of the cylinder block in any one of the positions of the coupling member.

The motor advantageously comprises a flange fast in rotation with the driving shaft and the first mechanical engagement means comprise a first engagement member located on a radial face of said flange and a second engagement member located on a first radial face of the coupling member turned towards said radial face of the flange.

Thanks to these advantageous arrangements, the means for obtaining two speed ratios are simple and not cumbersome.

The motor advantageously comprises two distinct operating cubic capacities and means for selecting the cubic capacity. In that case, by using these selection means and the means for controlling the displacement of the coupling member, the motor is given four cubic capacity ratios.

BRIEF DESCRIPTION OF THE DRAWINGS

The invention will be more readily understood on reading the following description of an embodiment given by way of non-limiting example, with reference to the accompanying drawings, in which.

DESCRIPTION OF PREFERRED EMBODIMENT

Figure 1:
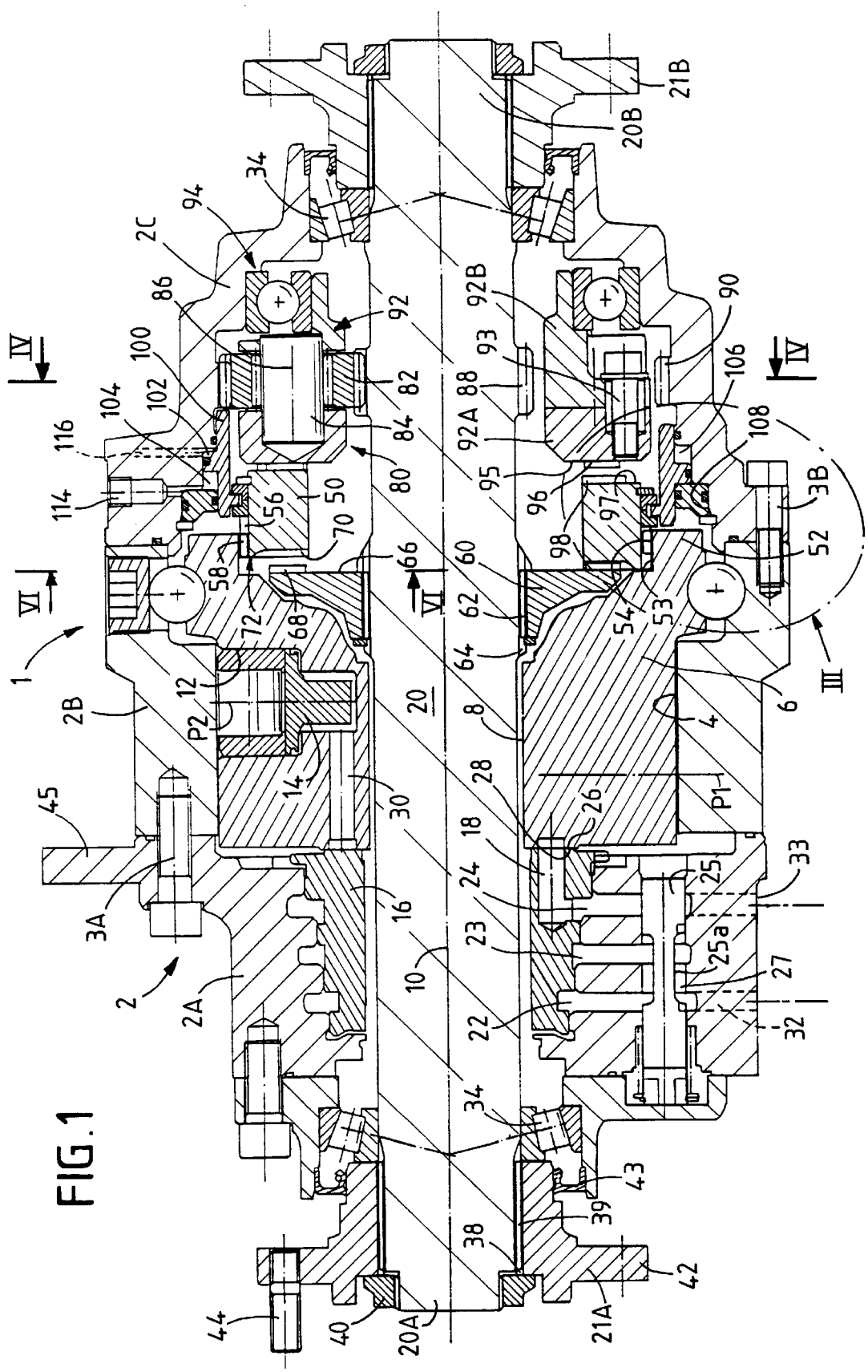
FIG. 1 is a view of the motor in axial section.

Referring now to the drawings, FIG. 1 shows a hydraulic motor 1 which comprises:

a fixed casing 2 in three parts 2A, 2B, 2C, assembled by screws 3A and 3B;

a lobed reaction cam 4 formed on the inner periphery of part 2B of the casing;

a cylinder block 6 which presents a central bore 8 and is mounted for relative rotation about an axis of rotation 10 with respect to the lobed reaction cam 4, this cylinder block comprising a plurality of radial cylinders 12 capable of being supplied with fluid under pressure, inside which pistons 14 are slidably mounted;

an inner fluid distributor valve 16 fast with the casing 2 with respect to rotation about axis 10 and comprising distribution conduits 18 capable of communicating with the cylinders 12; and a through shaft 20 which extends inside the casing 2 coaxially to the axis of rotation 10, the inner distributor valve 16 and the cylinder block 6 being disposed around this through shaft.

Grooves 22, 23 and 24 are arranged between part 2A of the casing and the inner distributor valve 16. The distribution conduits open out, on the one hand in one of these grooves (distribution conduit 18 opens out in groove 24), and, on the other hand, in the distribution face 26 of the distributor valve which is perpendicular to axis 10 and in abutment against the communication face 28 of the cylinder block. In this face 28, which is also perpendicular to axis 10, there open the conduits of cylinders 30, which are disposed so as to be able to be placed in communication with the distribution conduits.

The motor shown comprises two distinct operating cubic capacities (in the present case, two series of cylinders and pistons are disposed in different radial planes P1, P2), means for selecting the cubic capacity comprising a slide valve 25 mobile in a bore 27 being provided. In manner known per se, the three grooves 22, 23 and 24 are connected to the bore 27 and the slide valve presents a selection groove 25a which, in the first position of the slide valve 25 shown in FIG. 1, places the grooves 22 and 23 in communication (groove 24 being isolated), while, in the second position of the slide valve (not shown), it places grooves 23 and 24 in communication (groove 22 being isolated).

The slide valve 25 is conventionally controlled hydraulically between its two positions. Grooves 22 and 24 are respectively connected to principal conduits 32 and 33 (for supply or exhaust), while groove 23 is not connected to such a conduit. For example, the distribution conduits 18 connected to groove 24 are capable of being placed in communication with all the cylinders of the cylinder block, while the distribution conduits (not shown) respectively connected to grooves 22 and 23 are only capable of being respectively placed in communication with half of the cylinders.

Figure 2:
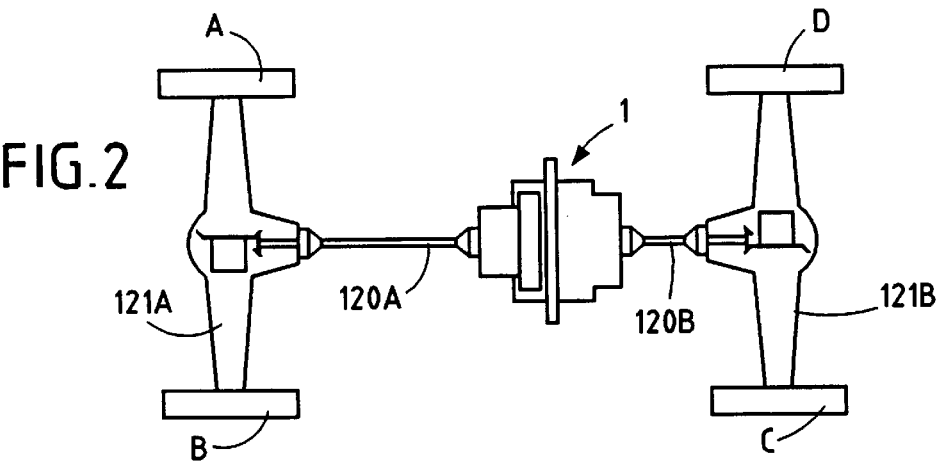
FIG. 2 is a schematic view of a transmission equipped with the motor of FIG. 1.

The through shaft 20 is mounted to rotate with respect to the casing 2, about the axis of rotation 10, via roller bearings 34. The two ends 20A and 20B of this shaft are capable of being connected, with the aid of coupling plates 21A and 21B, to two portions of transmission shaft 120A and 120B respectively (cf. FIG. 2). The shaft 20 is therefore aligned with the portions of shaft 120A and 120B and thus forms, with these two portions, the main shaft of the transmission. The two portions of shafts 120A and 120B are respectively connected to axles 121A and 121B by differentials. The motor 1 therefore drives the four driving wheels A, B, C and D of a vehicle.

Plates 21A and 21B are connected to the two ends 20A and 20B of the shaft 20 by splines 38 and 39 which respectively equip the central bores of the plates 21A and 21B and the opposite faces of the ends of the shaft 20. Pieces 40 for axially holding the coupling plates are fixed to the free ends of the shaft and cooperate with the end faces of these plates. These latter also present flanges 42 which, in manner known per se, make it possible to fix them (by screws 44) to the universal joint supporting the ends of the portions of transmission shaft 120A and 120B. The casing 2 of the motor is closed at each of its ends on one of the coupling plates, by an annular lipped joint 43 known per se. Part 2A of the casing of the motor presents a flange 45 which forms part of the means for fixing this motor to the chassis of the vehicle.

The bore 8 of the cylinder block 6 is such that the shaft 20 is not directly connected in rotation with the cylinder block.

According to the invention, the driving shaft 20 may be driven by the cylinder block at two ranges of speeds. To that end, the motor 1 comprises a coupling member 50 which is fast in rotation with the cylinder block. In the example shown, this member 50 comprises an annular shaft which is mounted concentric with the driving shaft 20 and disposed therearound. Splines ensure connection in rotation of the member 50 and of the cylinder block. More precisely, the cylinder block 6 presents an axial extension 52 of which an axial face 53 is provided with splines 54. The coupling member 50 also presents an axial face 56 provided with splines 58, the latter being adapted to cooperate with splines 54. In the example shown, the axial face 53 of the extension 52 faces towards axis 10, while the axial face 56 of the member 50 is an "outer" face turned towards the opposite side. As will be specified in the following, the member 50 may be axially displaced between at least two distinct positions. The splines of at least one of the series of splines 54 and 58 are sufficiently long for the member 50 and the cylinder block 6 to remain in mesh whatever the axial position of this member 50.

The motor 1 also comprise first mechanical engagement means for joining the coupling member 50 and the driving shaft 20 in rotation. In the example shown, the motor comprises to that end a flange 60, disposed radially and fast in rotation with the shaft 20 by cooperation of splines 62 equipping the central bore of the flange 60 and of splines 64 equipping the periphery of the shaft 20. A radial face 66 of the flange 60 (radial face turned away from the distributor valve 16) is equipped with a first engagement member 68. A second engagement member 70, adapted to cooperate with the first 68, is located on a radial face 72 of the coupling member 50 which is turned towards the radial face 66 of the flange (i.e. directed in the direction going towards the distributor valve). The first mechanical engagement means are therefore employed when the first and second engagement members 68 and 70 cooperate to connect the coupling member 50 and the flange 60 in rotation. Insofar as, as indicated hereinbefore, said member 50 and the flange are respectively fast in rotation with the cylinder block and the shaft 20, the cooperation of the first and second engagement members 68 and 70 renders the shaft 20 fast in rotation with the cylinder block.

In the example shown, the first mechanical engagement means are constituted by a claw, the engagement members 68 and 70 being respectively constituted by a first and by a second series of teeth. Some teeth (68a, 68b, 68c) of the first series of teeth 68 and some teeth (70a, 70b, 70c) of the second series of teeth 70 have been shown in the schematic half-section of FIG. 6. When the claw is in mesh, these teeth are imbricated in one another. They present complementary shapes adapted to that end (in order to avoid overloading the Figure, the teeth are not hatched).

Figure 6:
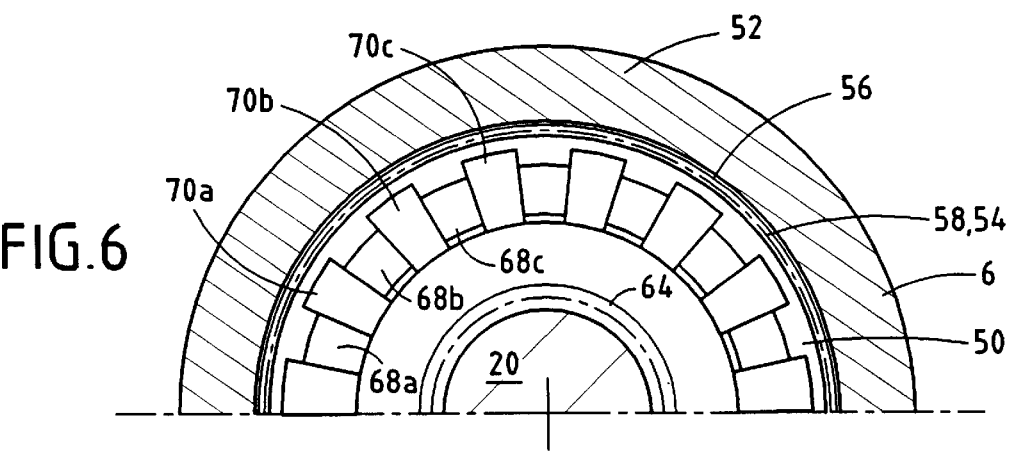
FIG. 6 is a schematic section along line VI—VI of FIG. 1.

FIG. 6 schematically indicates the splines 64 of the shaft 20 and the splines 58 and 54.

The claw constitutes an advantageous embodiment of the mechanical engagement means; however, the engagement members may be constituted by friction plates or the like.

Figure 4:
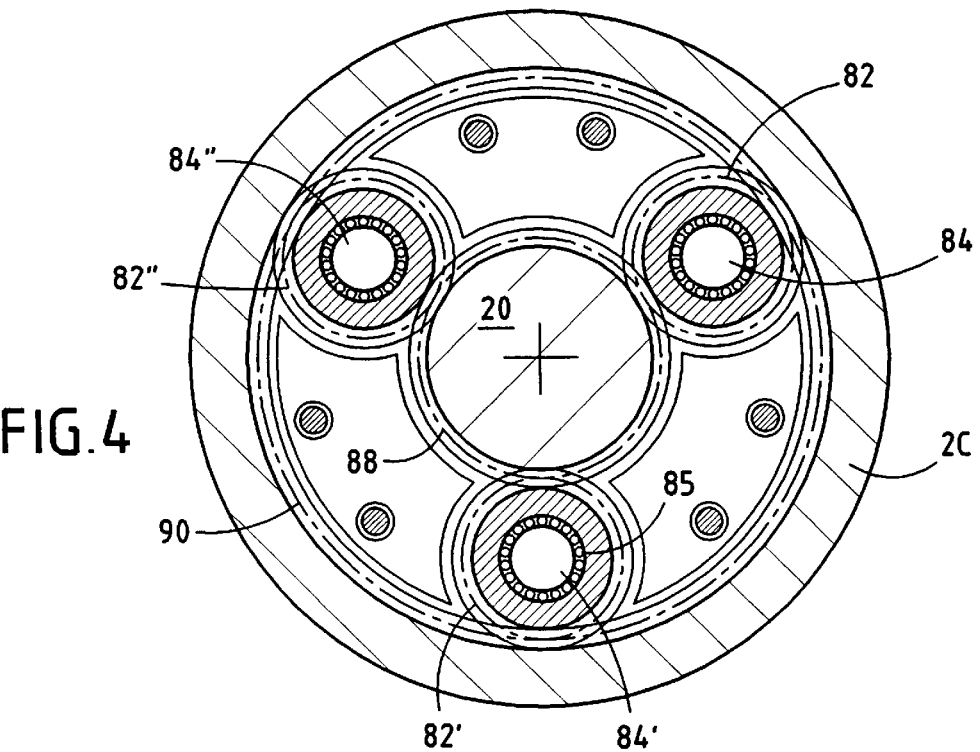
FIG. 4 is a view in section in the radial plane IV—IV of FIG. 1.

The motor further comprises a step-up gear 80 which comprises at least one multiplier member 82 mounted on a secondary shaft 84 having an axis 86 parallel with the axis 10 of rotation of the motor. In the advantageous example shown in the Figures, and as is more readily seen in FIG. 4, the step-up gear 80 is a gear train of which the sun gear is constituted by the driving shaft 20 which, to that end, comprises a toothing 88, and whose planet gears are constituted by toothed wheels (three wheels 82, 82' and 82"). These wheels are respectively fast in rotation with a second axis 84, 84', 84" respectively, via complementary splines overall designated by reference 85. The planetary gears 82, 82', 82" roll on the inner periphery of part 2C of the casing, which therefore constitutes a fixed ring and is provided with a toothing 90.

The ratio between the number of teeth of the toothing 90 and that of the toothing 88 is included between 2 and 3, with the result that, when the driving shaft 20 is driven via the step-up gear, its speed of rotation of from three to four times greater than that of the cylinder block.

The step-up gear comprises a ring 92 for supporting the secondary shaft or shafts 84, 84', 84". This ring 92 is mounted to rotate freely with respect to part 2C of the casing, via a ball bearing 94. It is in fact constituted by two annular parts 92A and 92B, connected with the aid of screws 93.

The second mechanical engagement means, which serve to connect the coupling member 50 and the step-up gear 80 in rotation, comprises a third engagement member 96 located on a radial face 95 of the ring 92 (more precisely of its part 92A), as well as a fourth engagement member 98 located on a second radial face 97 of the coupling member 50, which is turned towards the radial face 95 mentioned above. In fact, faces 72 and 97 of the coupling member 50 on which the second and fourth engagement members are respectively arranged, are opposite. Like the first engagement means, the second engagement means advantageously comprise a claw, in which case the engagement members 96 and 98 are constituted by two series of teeth capable of coming into mesh, whose conformation is overall similar to that of the series of teeth 68 and 70 shown in FIG. 6. Once again, other possibilities may be imagined, for example friction plates.

As indicated hereinbefore, the coupling member 50 is axially mobile between two end positions. In the first, shown in the lower half of FIG. 1 and in FIG. 3, the first engagement means are activated, i.e. the engagement members 68 and 70 are in mesh, while the second engagement means are de-activated, i.e. the third and fourth engagement members 96 and 98 are spaced apart from each other. In this way, in the first position, the speed of rotation of the driving shaft 20 is equal to that of the cylinder block.

In the second position, shown in the upper half of FIG. 1, the two engagement means are activated, i.e. the engagement members 96 and 98 are in mesh, while the first engagement means are de-activated, i.e. the engagement members 68 and 70 are spaced apart. Under these conditions, the speed of rotation of the driving shaft 20 is multiplied with respect to the speed of rotation of the cylinder block in a ratio equal to 1+R, where R designates the ratio between the number of teeth of toothing 90 and that of toothing 88.

Figure 3:
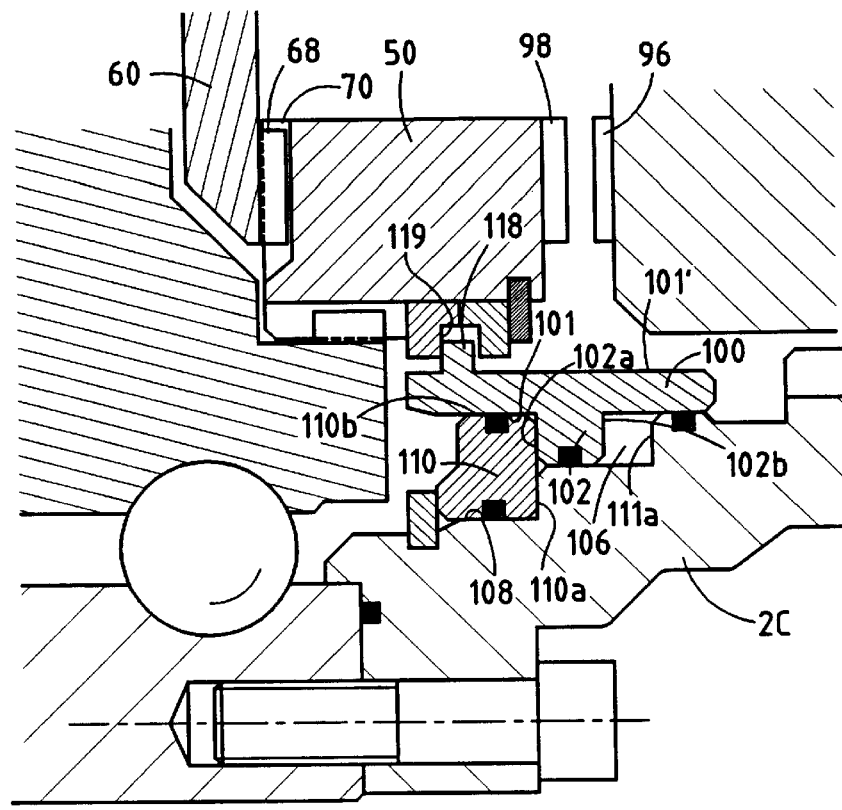
FIG. 3 is an enlarged view of detail III of FIG. 1.

The motor comprises means for controlling the displacement of the coupling member 50 between its two end positions. It is preferably question of hydraulic control means which, as is seen in particular in FIGS. 1 and 3, are constituted by a double-action jack which comprises a control ring 100, axially fast with the member 50 and provided with an annular piston 102 (for example constituted by a swell forming part of the ring) disposed on its outer periphery. A first (104) and second (106) control chamber are respectively arranged on either side of the piston. More precisely, the first chamber 104 is arranged between the inner periphery 108 of the casing (its part 2C), the outer axial periphery 101 of the ring 100 and a first radial face 102a of the piston 102. On the side opposite this radial face 102a, the chamber 104 is closed by the radial face 110a of a ring 110, the axial face 101 of the ring being in tight sliding contact on the inner axial face 110b of this ring.

The second control chamber 106 is arranged between the inner periphery 108 of the casing, the outer axial periphery 101 of the ring of the other side of the piston 102 and a second radial face 102b of the latter opposite face 102. Opposite face 102b, the chamber 106 is closed by a shoulder 111a made on the inner periphery 108 of the casing. Of course, chambers 104 and 106 are rendered hermetic by seals. The first and second end positions of the piston 102 are respectively defined by the cooperation in stop of face 102a of this piston with the radial face 110a of the ring 110 and by the cooperation of face 102b of the piston with the shoulder 111a.

A first and a second auxiliary conduit 114 and 116 respectively, communicate respectively with the first and second control chambers 104 and 106.

The coupling member 50 is axially fast with the ring 100. To that end, the inner axial periphery 101' of the latter presents an annular rib 118 which is housed in an annular groove 119 of the outer axial periphery of the member 50.

It will be understood that the effect of the injection of pressurized fluid via conduit 116 in chamber 106 is to displace the ring and the member 50 into the first position of said member, while the injection of pressurized fluid via conduit 114 causes a displacement towards the second position of the member 50. When one of the chambers 104 and 106 is supplied with fluid under pressure, the fluid contained in the other of these chamber may be evacuated via the auxiliary control conduit connected to this other chamber.

Figure 5A:
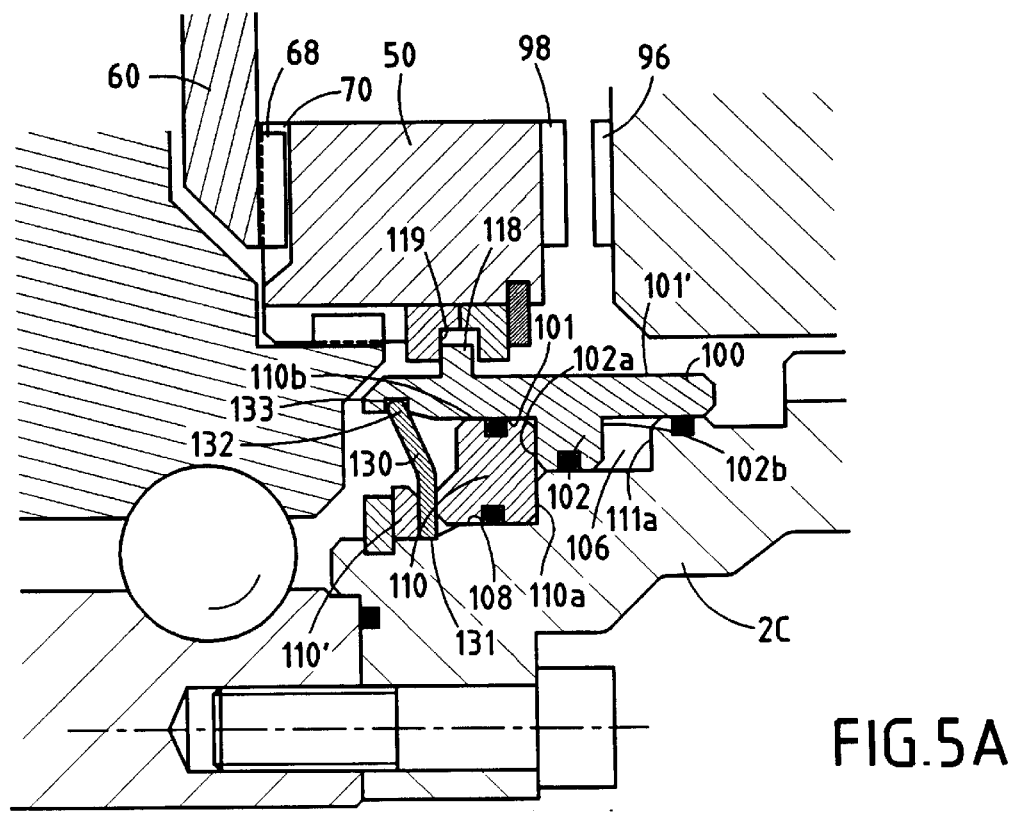
FIGS. 5A, 5B and 5C are views similar to FIG. 3, showing a variant embodiment in three different situations.
Figure 5B:
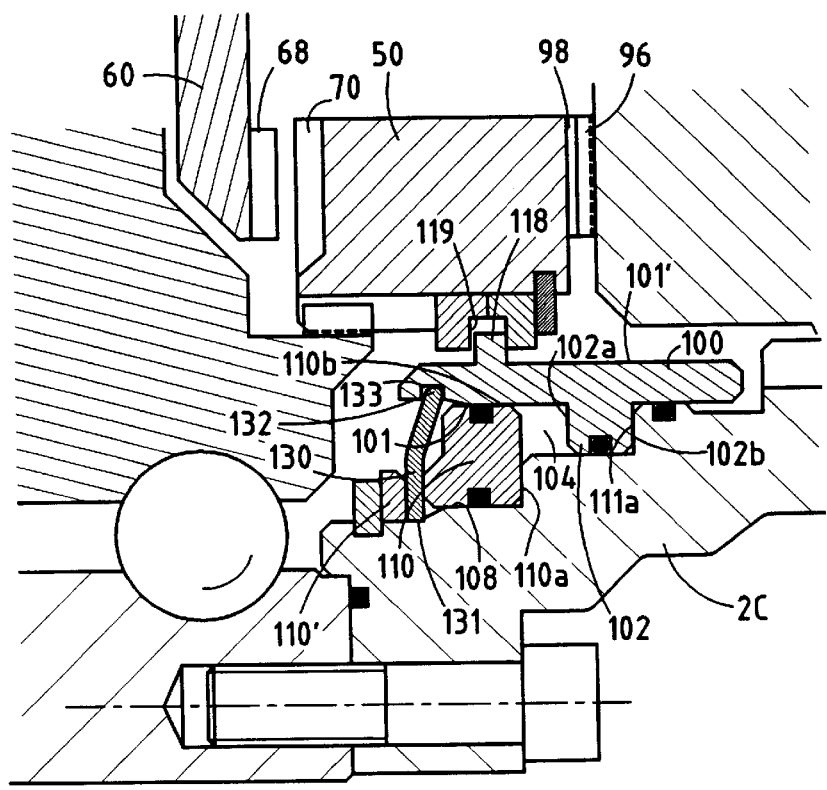
Figure 5C:
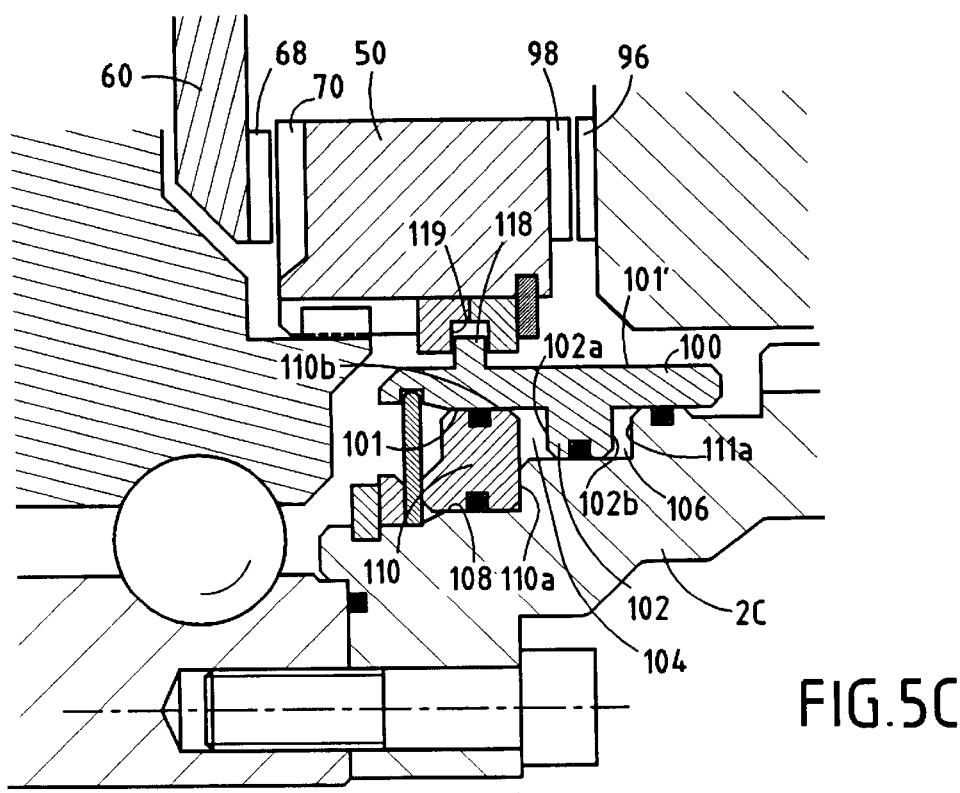

FIGS. 5A to 5C will now be described, which show a variant embodiment in which the coupling member is capable of adopting, in addition to the two end positions mentioned above, a third stable intermediate position in which the first and the second mechanical engagement means are de-activated, with the result that shaft 20 may rotate freely with respect to the cylinder block. In the example shown, the means for defining this third position comprise an elastic washer 130 fixed with respect to the casing 2C and with respect to the ring 100, this washer 130 being capable of elastically deforming on either side of its stable non-deformed position when the ring 100 urges the coupling member in its first or its second position as shown in FIGS. 5A and 5B. On the other hand, in its stable non-deformed position, the washer 130 maintains the ring 100 (chambers 104 and 106 not being under pressure) in an intermediate position, in which the latter itself maintains the coupling member 50 in its intermediate position in which neither the first nor the second engagement means are active. The action of the fluid in the chamber 104 or 106 is obviously preponderant on the elastic return action of the ring 130 to ensure a rapid passage from the intermediate position to one or the other of the first and second positions.

The outer periphery 131 of the washer 130 (i.e. its outer edge remote from axis 10) is fixed with respect to the inner periphery 108 of the casing 2C. To that end, this edge 131 of the washer is inserted between the ring 110 and a fixing ring 110'. The inner periphery 132 of the washer 130 (i.e. its inner edge) is fixed with respect to the ring 100 of the control jack, being for example quite simply inserted in a groove 133 that the outer axial face 101 of this ring presents. In its non-deformed position in the free state, the washer 130 extends, in the example shown, in a radial plane with respect to axis 10.

The washer 130 may be constituted by a solid ring or by a ring having an indented structure in axial view, the "troughs" of the indentations being fixed to ring 100 and the "crests" of the indentations being fixed to casing 2C.

The invention makes it possible to drive a machine in translation in two distinct configurations: either with a range of low speeds (of the order of 75 to 150 rpm at the level of the motor, corresponding to working speeds of 6 to 12 km/hr.), or with a range of high speeds (of the order of 260 to 520 rpm at the level of the motor, corresponding to speeds of displacement of 22 to 44 km/hr). With the variant in which the coupling member may adopt a third intermediate position, a third configuration is possible: that in which the motor is disengaged in order to allow the machine to be towed at any speed.

What is claimed is:

1. A hydraulic motor, comprising:
    a fixed casing comprising principal fluid supply and exhaust conduits;
    a reaction member fast with the casing;
    a cylinder block mounted for relative rotation about an axis of rotation with respect to said reaction member and which comprises a plurality of cylinder and piston assemblies, disposed radially with respect to the axis of rotation and capable of being supplied with fluid under pressure;
    an inner fluid distributor valve fast with the casing with respect to rotation about the axis of rotation, and comprising distribution conduits capable of placing the cylinders in communication with the principal fluid supply and exhaust conduits; and
    a driving shaft extending inside the casing coaxially to the axis of rotation and capable of being driven in rotation with the cylinder block,
the hydraulic motor being a low-speed, high-torque motor, and further comprising, disposed inside the casing:
    a coupling member fast in rotation with the cylinder block,
    first mechanical engagement means for connecting the coupling member and the driving shaft in rotation,
    a step-up gear comprising at least one step-up member, capable of driving the driving shaft in rotation and mounted on a secondary shaft having an axis parallel to the axis of rotation of the motor, and
    second mechanical engagement means for connecting the coupling member and the step-up gear in rotation,
    the coupling member being mobile between a first position in which the first mechanical engagement means are activated, while the second mechanical engagement means are de-activated, and a second position in which the second mechanical engagement means are activated, while the first mechanical engagement means are de-activated,
        the motor comprising means for controlling the displacement of the coupling member between said first and second position, and
        the driving shaft is a through shaft capable of forming a portion of a main shaft of a transmission of a vehicle.
2. The motor of claim 1, wherein the coupling member comprises an annular shaft mounted concentric with the driving shaft and therearound.
3. The motor of claim 2, wherein the cylinder block presents an axial extension having an axial face provided with splines, while the coupling member presents an axial face likewise provided with splines adapted to cooperate with said splines of the axial extension of the cylinder block in any one of the positions of the coupling member.
4. The motor of claim 1 or 2, wherein the motor comprises a flange fast in rotation with the driving shaft and
    the first mechanical engagement means comprise a first engagement member located on a radial face of said flange and a second engagement member located on a first radial face of the coupling member turned towards said radial face of the flange.
5. The motor of claim 1 or 2, wherein the step-up gear comprises a ring for supporting the secondary shaft and
    the second mechanical engagement means comprise a third engagement member located on a radial face of said supporting ring and a fourth engagement member located on a second radial face of the coupling member turned towards said radial face of the ring.
6. The motor of claim 1 or 2, wherein the step-up gear comprises at least one toothed wheel which meshes on a first and a second toothing respectively fast with the inner periphery of the casing and of the driving shaft, and which constitutes said at least one step-up member.
7. The motor of claim 1 or 2, wherein the step-up gear comprises a ring for supporting the secondary shaft,
    the second mechanical engagement means comprise a third engagement member located on a radial face of said supporting ring and a fourth engagement member located on a second face of the coupling member turned towards said radial face of the ring, and
    wherein the step-up gear further comprises at least one toothed wheel which meshes on a first and a second toothing respectively fast with the inner periphery of the casing and of the driving shaft, and which constitutes a multiplier member.
8. The motor of claim 1 or 2, wherein the first and/or the second mechanical engagement means comprise a claw.
9. The motor of claim 1 or 2, wherein the means for controlling the coupling member are constituted by a double-action jack comprising a ring, fast with said coupling member and provided with an annular piston disposed on its outer periphery, a first and a second control chamber being respectively arranged between the inner periphery of the casing, the outer periphery of the ring and, respectively, a first and a second radial face of said piston, a first and a second auxiliary control conduit communicating respectively with the first and with the second control chamber.

10. The motor of claim 1 or 2, wherein the motor comprises means for defining a third position of the coupling member, in which the first and second mechanical engagement means are de-activated.

11. The motor of claim 9, wherein the motor comprises an elastic washer having an outer periphery fixed with respect to the inner periphery of the casing and an inner periphery fixed with respect to the outer periphery of the ring of the jack, and the washer is capable of being elastically deformed on either side of a configuration in a free state in order to accompany the displacement of the coupling member into said first and into said second position, while, in a configuration in the free state, the washer maintains said coupling member in a third position.

12. The motor of claim 1 or 2, wherein the motor comprises two distinct operating cubic capacities and cubic capacity selection means for selecting said two distinct operating cubic capacities.

13. A hydrostatic transmission comprising:

a hydraulic motor comprising:

a fixed casing comprising principle fluid supply and exhaust conduits, a reaction member fast with the casing, a cylinder block mounted for relative rotation about an axis of rotation with respect to said reaction member and which comprises a plurality of cylinder and piston assemblies, disposed radially with respect to the axis of rotation and capable of being supplied with fluid under pressure, an inner fluid distributor valve fast with the casing with respect to rotation about the axis of rotation, and comprising distribution conduits capable of placing the cylinders in communication with the principal fluid supply and exhaust conduits, and a driving shaft having a first end and a second end, and extending inside the casing coaxially to the axis of rotation and capable of being driven in rotation with the cylinder block, the hydraulic motor being a low-speed, high-torque motor, and further comprising, disposed inside the casing:

a coupling member fast in rotation with the cylinder block, first mechanical engagement means for connecting the coupling member and the driving shaft in rotation, a step-up gear comprising at least one step-up member, capable of driving the driving shaft in rotation and mounted on a secondary shaft having an axis parallel to the axis of rotation of the motor, and second mechanical engagement means for connecting the coupling member and the step-up gear in rotation, the coupling member being mobile between a first position in which the first mechanical engagement means are activated, while the second mechanical engagement means are de-activated, and a second position in which the second mechanical engagement means are activated, while the first mechanical engagement means are de-activated, the motor comprising means for controlling the displacement of the coupling member between said first and second position, the driving shaft is a through shaft capable of forming a portion of a main shaft of a transmission of a vehicle, and wherein the first and second ends of the driving shaft are respectively connected to a first and to a second axle of a vehicle.

* * * * *